(12) United States Patent
Knott

(10) Patent No.: US 6,310,777 B1
(45) Date of Patent: Oct. 30, 2001

(54) ELECTRONIC APPARATUS

(75) Inventor: John Knott, Court Farm, Henton, Somerset, BA5 1PD (GB)

(73) Assignees: John Knott; Terence Ivan Mason, both of (GB)

( * ) Notice: Subject to any disclaimer, the term of this patent is extended or adjusted under 35 U.S.C. 154(b) by 0 days.

(21) Appl. No.: 09/549,576

(22) Filed: Apr. 14, 2000

(30) Foreign Application Priority Data

Apr. 17, 1999 (GB) .................................................. 9908741

(51) Int. Cl.[7] ........................................................ G06F 1/16
(52) U.S. Cl. .......................... 361/726; 361/683; 361/685; 361/727; 395/283; 364/236.2; 364/708.1
(58) Field of Search ..................... 361/683–685, 361/724–727, 754, 798, 732, 736, 740, 747, 759, 786, 801, 686, 804, 825; 364/636.2, 248.1, 280.1, 280.2, 927.83, DIG. 1, DIG. 2; 360/903, 99.06, 137, 97.01; 312/223.2, 274, 298, 277.5; 439/62, 64, 377, 74, 326, 928, 152, 153, 155, 157, 159, 160, 296–298, 374

(56) References Cited

U.S. PATENT DOCUMENTS

| | | | |
|---|---|---|---|
| Re. 35,915 | * 10/1998 | Hastings et al. | 439/377 |
| 4,725,244 | * 2/1988 | Chewning et al. | 439/296 |
| 4,893,210 | 1/1990 | Mintzlaff | 360/137 |
| 5,077,722 | 12/1991 | Geist et al. | 369/75.1 |
| 5,454,080 | * 9/1995 | Fasig et al. | 395/283 |
| 5,483,419 | * 1/1996 | Kaczeus et al. | 361/685 |
| 5,579,204 | * 11/1996 | Nelson et al. | 361/685 |
| 5,726,922 | * 3/1998 | Womble et al. | 364/708.1 |
| 5,764,434 | * 6/1998 | Hanson | 360/97.01 |
| 5,822,184 | * 10/1998 | Rabinovitz | 361/685 |
| 6,049,452 | * 4/2000 | You et al. | 361/685 |

FOREIGN PATENT DOCUMENTS

| | | |
|---|---|---|
| 2328547 | 2/1999 | (GB) . |
| 410133779-A | * 5/1998 | (JP) .................................. G06F/1/16 |
| WO 93/18517 | 9/1993 | (WO) . |

* cited by examiner

Primary Examiner—Leo P. Picard
Assistant Examiner—Michael Datskovsky
(74) Attorney, Agent, or Firm—Blank Rome Comisky & McCauley, LLP

(57) ABSTRACT

Data recording apparatus including the plurality of removable hard disk drives (3) for recording data thereon, at least two said drives (3) being located on a removable carrier (2) which facilitates the insertion and removal thereof from the apparatus, a zero insertion force connector (4, 6) which provides electrical connections between the drives (3) on the carrier (2) and the apparatus, a switch (22) for connecting an disconnecting power to the disc drives (3) on the carrier (2), and interlock (12) for preventing the zero insertion force connector (4, 6) being connected or disconnected without the switch (22) having first been operated to disconnect power fron the disc drives (3).

5 Claims, 5 Drawing Sheets

ELECTRONIC APPARATUS

FIELD OF THE INVENTION

This invention concerns electronic apparatus and more particularly such apparatus which includes a plurality of removable magnetic hard disk drives to store data.

BACKGROUND TO THE INVENTION

Magnetic hard disk drives are an essential part of the modern personal computer, such drives being used to store large amounts of data in digital form. It is possible but unusual to change the hard drive of a personal computer, but when such a change is effected the computer has in general be powered down before the drive can safely be removed and new drive inserted in order not to cause damage to the drive. This is usually not a problem as shutting down computer and restarting it is relatively rapid compared with the time it takes to place the hard drive itself.

Magnetic hard drives do, however, have other uses then as memory devices for personal computers. In particular, they can be used as storage media for large amounts of data because of their large capacity combined with the speed with which such data can be recorded. In some applications, a plurality of such drives are used for the simultaneous recording of data.

As will be appreciated, although hard disk drives can store very large amounts of data, for example 10 Gb or more, there comes a time when they are full to capacity and need to be changed for empty drives. However, this causes problems when continuous data recording is required because it is then impossible to power down the whole data recording system.

An approach to this problem has been to locate each hard disk drive in a carrier which in turn is locked in place in a suitable slot in the data reporter, the drive making electrical connection with the rest of the recording system through a suitable plug and socket. The plug and socket enable the necessary electrical connections to be made, and the lock which can be used to lock the carrier in the slot and prevent its removal, activates a switch which controls the electrical power to the hard drive. Thus, when the lock is unlocked, thereby enabling the carrier and hard drive to be inserted and removed, power to the drive has been disconnected and the drive can be safely inserted or removed, However, locking the lock both serves to prevent the carrier and associated drive from being removed, and it also applies power to drive via a switch which is activated in the process of locking the lock.

Whilst the interlock on the power supply to the individual hard drives usual is that the drives can be replaced without damage to the ensures that the drives can be replaced without damage to the drives and/or other devices in the data recorders caused, for example, by breaking one or more connections between them prior to the drive being powered down, it does not remove the problem of in some cases of having to replace the large number of drives at the same time. Furthermore, when multiple drive changes are effected, it is usually important to identify which drive was located in which slot for the data recorder because particular slots in these recorders are often used to record data of a particular type or from a particular source. Labels could be used to identify individual carriers, but with relatively large numbers having to changed at one time, and the large number of replacements, it becomes difficult to monitor the situation.

One possible solution to the problem would be to mount a plurality of hard disk drives in a single carrier and thereby enable all or the drives in the carrier to be replaced in a single operation, power to be drives then being controlled by a locking mechanism in a similar manner to that used hitherto for carriers holding a single hard drive. Unfortunately, a new problem is then encountered due to the high insertion and withdrawal forces required to connect and disconnected plug and socket connectors of the individual drives which typically involve making and breaking eighty connections each. Data recorders recording simultaneously on eight hard drives would then require such large forces to plug and unplug all eight connections simultaneously that doing so is either physically impossible by hand or it results in damage to the equipment itself.

A solution to the problem of high insertion force for a multiplicity of connectors would be to use a so-called zero insertion force connector, such connectors being available with several hundred connections. However, zero insertion force connectors do not make all of their contacts simultaneously, and electrical damage could occur if they were used to connect a plurality of hard disk drives in carrier into a data recorder because the power supply to the drives could stay on after or be switched on before other connections are broken or made.

SUMMARY OF THE INVENTION

According to the present dimension there is provided data recording apparatus including the plurality of removable hard disk drives for recording data thereon, at least two of said drives being located on a removable carrier which facilitates the insertion and removal thereof from the apparatus, a zero insertion force connector which provides electrical connections between the drives on the carrier and the apparatus, switch means for connecting and disconnecting power to the disc drives on the carrier, and interlock means for preventing the zero insertion force connector being connected or disconnected without the switch means having first been operated to disconnect power from the disc drives.

DETAILS OF THE INVENTION

The present invention enables a plurality of hard disc drives to be replaced simultaneously with the data recording apparatus itself still powered up, and the use of a zero insertion force connector to provide connections between the carrier used to hold the drives and the apparatus itself facilitates this process. As a result, the exchange of a plurality of hard drives is particularly facilitated, and problems associated with identifying individual drives when they are replaced individually are avoided.

Various types of zero insertion force connector are known in the electronics art. However, it is generally preferred for the present invention to use such connectors having a rotatable shaft for locking and unlocking them, the shaft being rotatable about an axis substantially perpendicular to the plane of the mating surfaces of the connector. These connectors have the particular advantage that the half of the connector having the rotatable shaft can be mounted on the carrier, and substantially in the plane of the rear of the carrier, with the rotatable shaft being extended if necessary so that is accessible from the front of the carrier.

When a zero insertion force connector with a rotatable actuating shaft is used, the interlock means preferably prevents rotation of the shaft unless the switch means has previously been actuated to disconnect electrical power from or prevent the application of electrical power to the disc drives. This enables the carrier to be safely removed from or inserted into the rest of the recorder with the zero insertion force connector unlocked and the switch means in a state where it stops power being applied to the hard disc drives.

It is particularly preferred that the interlock means physically maintains the switch means in a state where electrical power cannot be applied to the disc drives until the zero insertion force connector has been mated and electrical connections have been completed between the respective halves of the connector, for example by rotating the actuating shaft of the connector to its locked position when the connector is lockable and unlockable by such means.

Other types of zero insertion force connector can be used in accordance with the present invention, for example those which lock and unlock merely be repeatedly pushing the two halves of the connectors together, locking being effected by pushing the two halves together and unlocking being effected by pushing the mated halves together again, and those which have rotatable actuating shafts which rotate substantially in the plane of the mating surfaces of the connectors. These other types of connector are generally less preferred than those using a shaft which is rotatable substantially perpendicular to the plane of the mating surfaces of the connector because with these other connectors providing interlocks with the switch means to hold the latter in a state whereby the disc drives are reliably powered down while mating and unmating of the connectors is effected is relatively more difficult to achieve.

BRIEF DESCRIPTION OF THE DRAWINGS

An embodiment of data recording apparatus in accordance with this intervention will now be described with reference to the accompanying diagrammatic drawings in which.

PREFERRED EMBODIMENTS OF THE INVENTION

The illustrated data recorder consists of a standard rack unit 1 containing electronic equipment for supplying power and data to a removable cartridge 2 including a plurality of hard disc drives 3.

Figure 2:
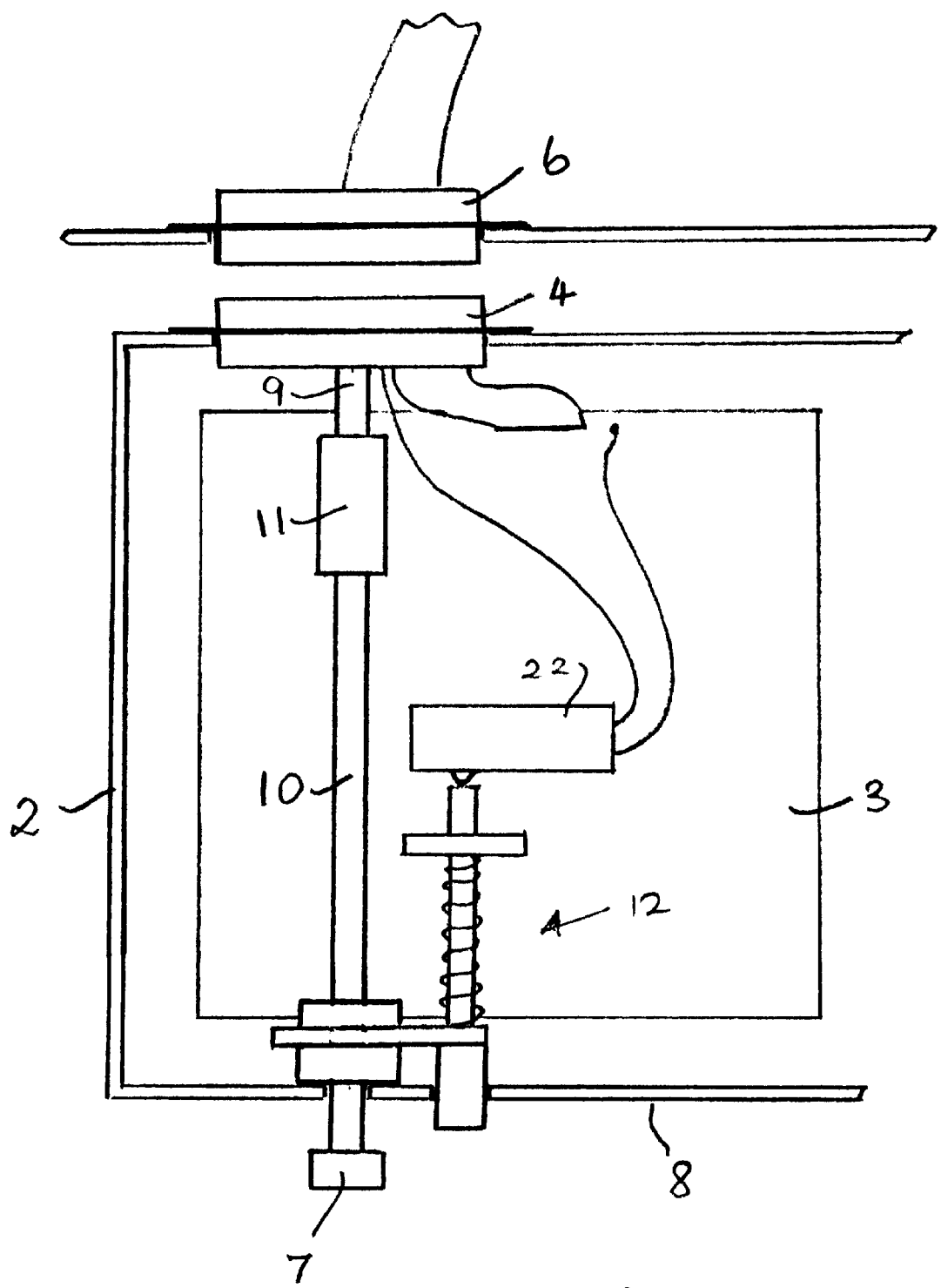
FIG. 2 is a part cut away horizontal section, to an enlarged scale, of the removable cartridge of FIG. 1 taken on line I—I of FIG. 3.

As can be seen more clearly from FIG. 2, the cartridge 2 includes one half 4 of a zero insertion force connector 5, the other half 6 being attached to the equipment in the unit 1. The connector 5 can be locked and unlocked by an operating handle 7 on the front 8 of the cartridge 2, the handle 7 being connected to the operating shaft 9 of the connector 5 by a shaft 10 and a coupler 11. Electrical connection between the two halves 4 and 6 of the connector 5 can then be made by pushing the cartridge 2 into the unit 1 with the handle 7 in its unlocked position until the two halves of the connector 5 have mated, after which the handle 7 is rotated to its locked position. The handle 7 is, however, prevented from free rotation by a mechanical interlock shown generally at 12.

Figure 5:
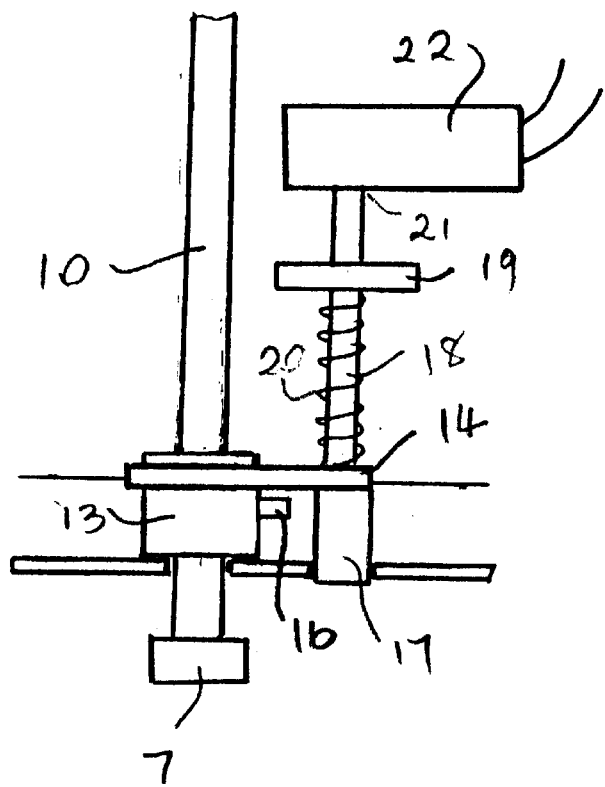
FIG. 5 shown the portion of FIG. 2 shown in FIG. 4 with the locking mechanism actuated.
Figure 4:
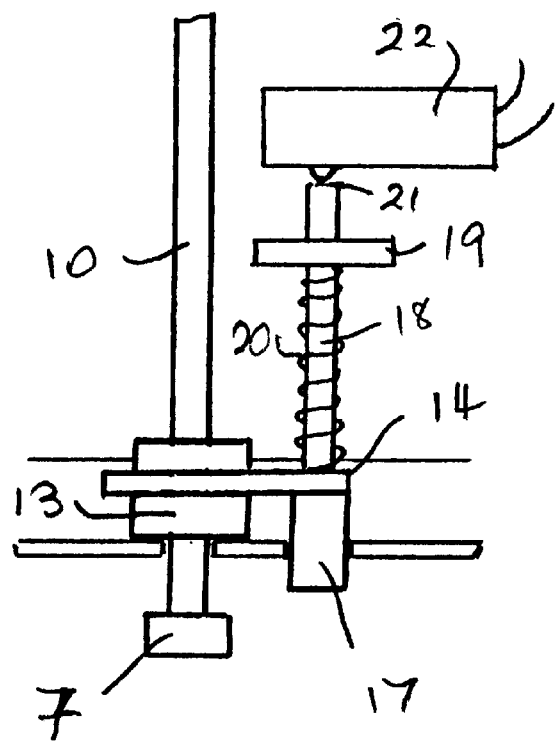
FIG. 4 shows a portion of FIG. 2.

The functioning of the interlock 12 can be seen more clearly with reference to FIGS. 4 and 5, FIG. 4 showing the interlock 12 in the unlocked position, and FIG. 5 showing the interlock 12 in its unlocked state.

Figure 3:
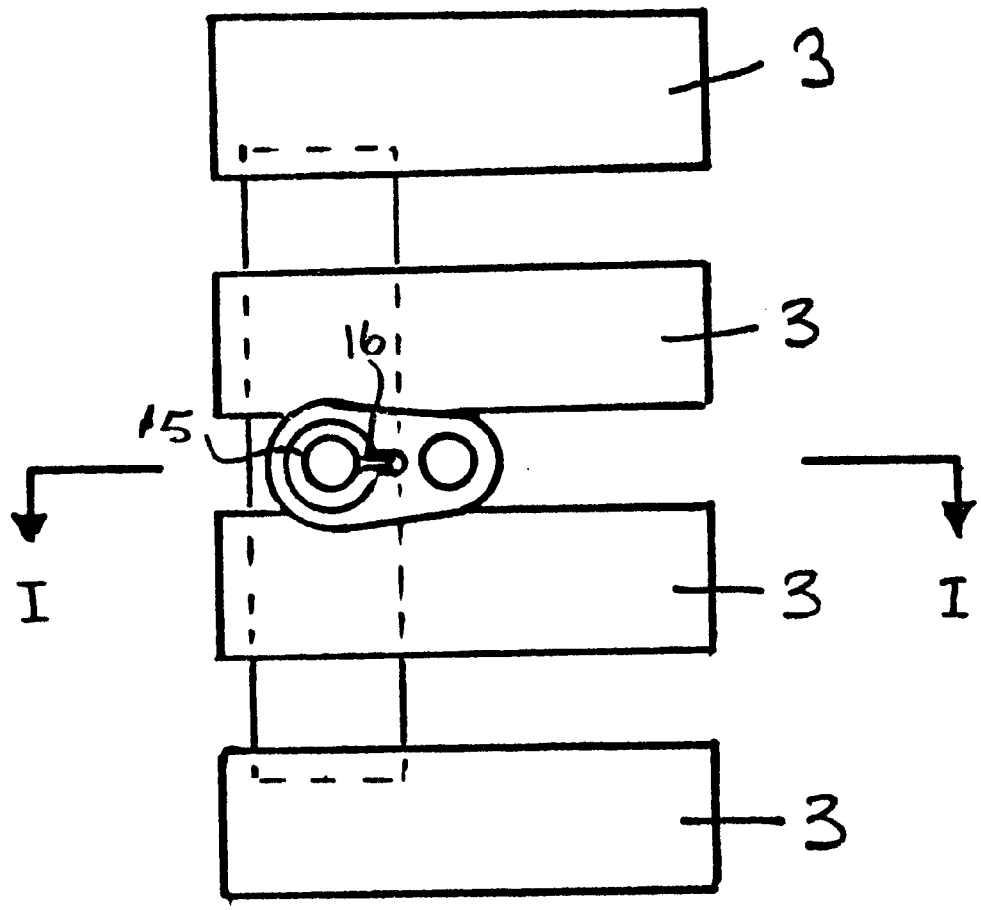
FIG. 3 is a part cut away vertical section, to an enlarged scale, of the removable cartridge of FIG. 1.

The interlock 12 consists of a collar 13 which is fast on the shaft 10, and a spring loaded locking plate 14. As can be seen from FIG. 3, the locking plate 14 has a slotted hole 15 in which is located the shaft 10, and the shaft 10 includes a pin 16 which can engage the slotted hole 15. In the position of the plate 14 shown in FIG. 4, the collar 13 is prevented from being rotated because the pin 16 is located in the slot in the hole 15.

The interlock 12 is opened, as shown in FIG. 5, by pushing an interlock button 17 which in turn pushes the locking plate 14 out of engagement with the pin 16, the plate 14 being slid along the collar 13. The button 17 is mounted on a shaft 18 which is free to slide through a fixed bracket 19, a compression spring 20 serving to urge the button 17, and the plate 14, into the locked position of the interlock 12. However, once the button 17 has been pressed and the shaft 7 rotated, the pin 16 holds the button 17 in its depressed state as shown in FIG. 5 whilst the pin 16 slides on the outer surface of the plate 14, thereby holding the switch 22 in its off position whilst the connector is disconnected and reconnected. The button 17 therefore only returns to the position shown in FIG. 4 when the pin 16 can enter the slot in the plate 14, which corresponds to the fully mated the position of the connector 5 with all connections established between the two halves 4 and 6, and in so doing the switch 22 is allowed to return to its position where power is applied to the disc drives on the carrier 2.

The end 21 of the shaft 18 remote from the button 17 is positioned relative to a microswitch 22 so that the switch 22 is activated by pressing the button 17. However, in addition to actuating the microswitch 22, pressing the button 17 not only frees the pin 16 from the slot in the hole 15, it also allows the operating handle 7 of the zero insertion force connector 5 to be turned to a position where the connector 5 is unlocked. With the button 17 in the position shown in FIGS. 2 and 4, the microswitch 22 is closed and power is applied to the hard drives in the cartridge 2. However, when the button 17 is pressed, the microswitch 22 is opened, thereby removing power from the hard drives in the cartridge 2.

Figure 6:
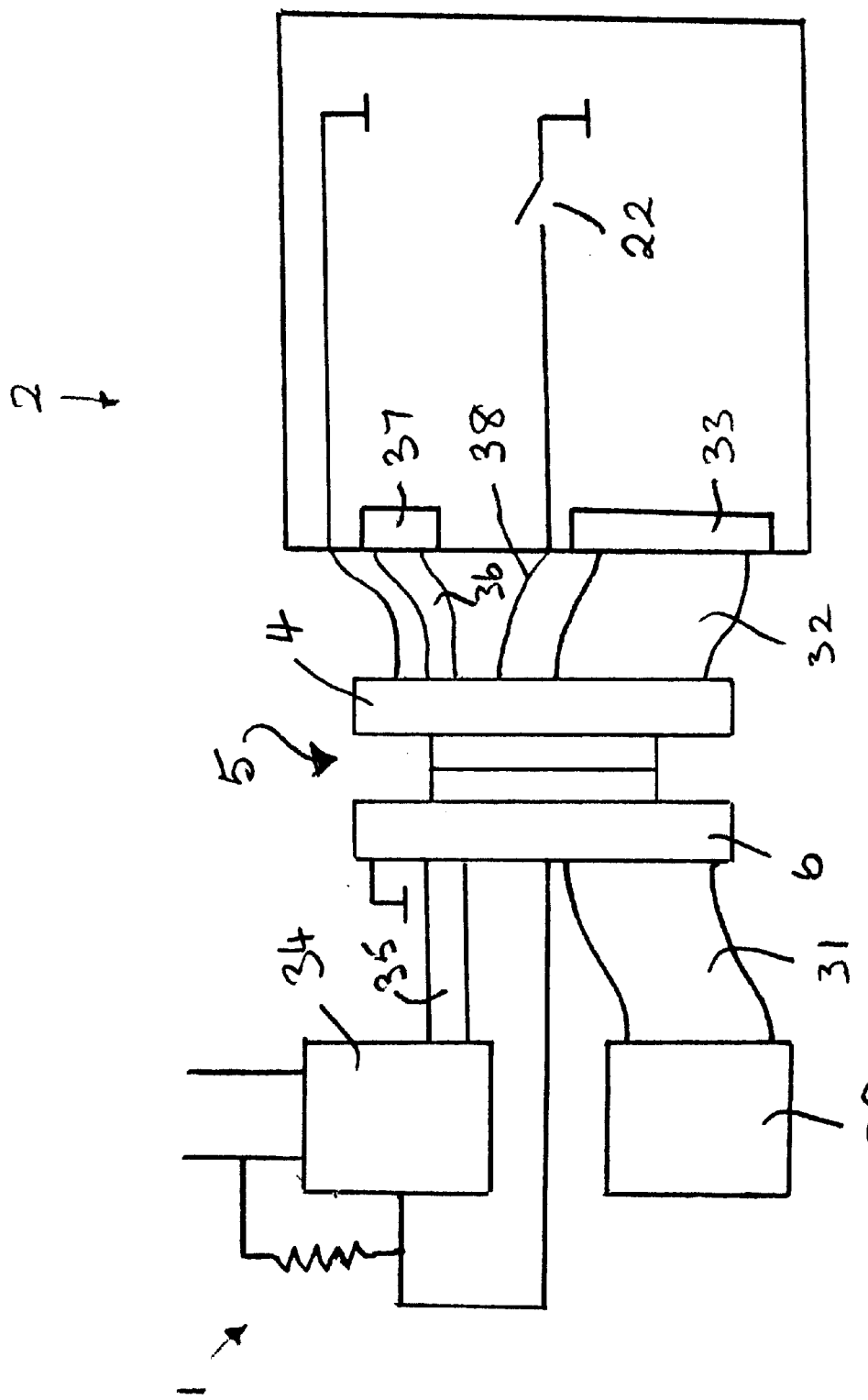
FIG. 6 is a schematic wiring diagram of a part of the embodiment.

The electrical connections between the unit 1 and the cartridge 2 can be seen in more detail in FIG. 6, the two being connected by the two halves 4 and 6 of the zero insertion force connector 5. Data from the unit 1 is fed via a disc controller 30 and a cable 31 through the connector 5 to the hard disc drives in the cartridge 2 via a cable 32 which is connected between the connector 5 and a data socket 33.

Power to the disc drives in the cartridge 2 is supplied via a power controller 34, cables 35, the two halves of the connector 5, cables 36 and a power socket 37. In addition, a switched line 38, switchable by the microswitch 22, is provided to enable the disc drives in the cartridge 2 to be powered down before the connector can be opened, for example using the mechanical interlock described above.

Figure 1:
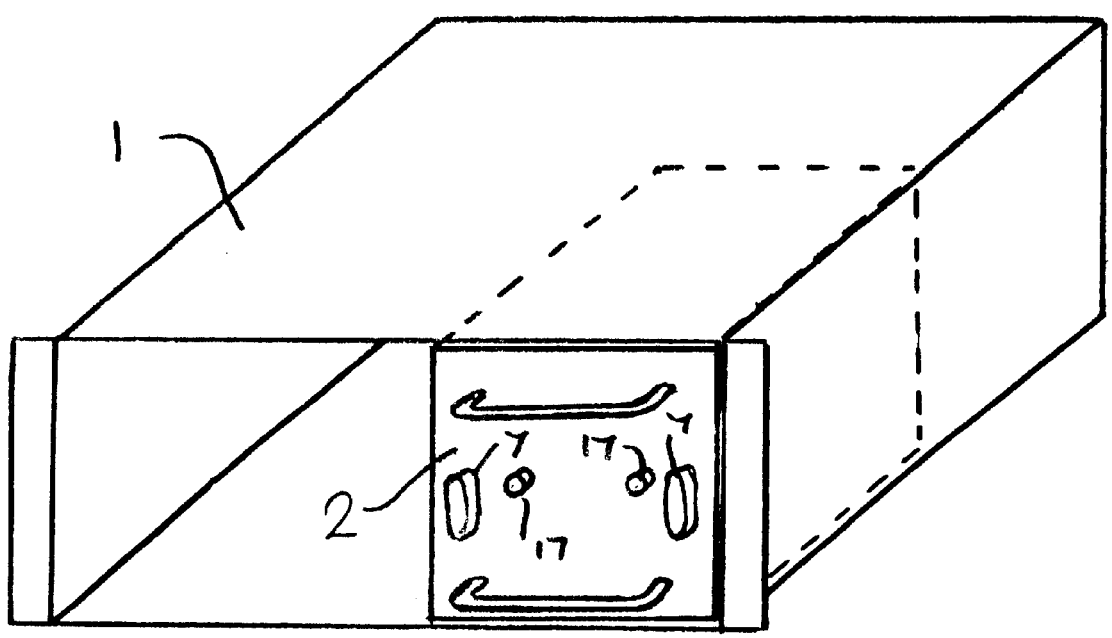
FIG. 1 is a perspective view of the embodiment which is in the form of a rack-mountable unit including a removable cartridge containing a plurality of hard disc drives.

The cartridge 2 of the embodiment of FIG. 1 has two zero insertion force connectors with associated operating levers 7 and interlock release buttons 17 plus associated power switches 22. As will be appreciated, the use of two zero insertion force connectors 5 enables the number of electrical connections between the cartridge 2 and the unit 1 to be doubled. Whilst the use of two switches 22 is not necessary with such an arrangement if the power supply to the cartridge 2 is fed through one of the connectors 5 which is in turn wired to one such switch 22, two switches 22 enable two power supplies to be disconnected before the connectors 2 are separated or a single power supply to be disconnected from one or more hard drives which are on a different power supply from the others.

It will also be appreciated that in addition to enabling cartridges 2 containing a plurality of hard drives to be inserted into a data recorder which is powered up, the present invention also enables cartridges 2 to be safely inserted into the units 1. Thus, in order for the two halves 4 and 6 of the zero insertion force connectors 2 to be mated or separated, the respective levers 7 have to be rotated from their locked positions to their open positions, and this necessitates first pressing the buttons 7 which prevents power from the unit 1 being applied to the disc drives in the cartridge 2. The cartridge 2 is then pushed into the unit 1 with the connectors 5 in their open positions until the respective halves 4 and 6 of the two connectors 5 become mated. The levers 7 can then be rotated to their respective closed positions, and the buttons 17 pop out as the pins 16 slip into the slots in the slotted holed 15 in the plates 14. Power is then applied to the disc drives in the cartridge 2.

In order to remove all power from lines carrying data from the disc controller 30, the cable 33 is arranged to provide terminator power to the controller 30 when power to the hard disc drives is turned off by the switch 22. Reinstatement of power to the disc drives 3 by reconnection of the supply to the carrier 2 by the switch 22 once the connector 5 is reconnected then results in the disc controller 30 powering up the data lines.

What is claimed is:

1. Data recording apparatus including the plurality of removable hard disk drives for recording data thereon, at least two of said drives being located on a removable carrier which facilitates the insertion and removal thereof from the apparatus, a zero insertion force connector which provides electrical connections between the drives on the carrier and the apparatus, switch means for connecting and disconnecting power to the disc drives on the carrier, and interlock means for preventing the zero insertion force connector being connected or disconnected without the switch means having first been operated to disconnect power from the disc drives.

2. Apparatus according to claim 1, wherein the zero insertion force connector has a rotatable shaft for locking and unlocking it, the shaft being rotatable about an axis substantially perpendicular to the plane of the mating surfaces of the connector.

3. Apparatus according to claim 1, wherein the interlock means prevents rotation of the rotatable shaft without previous actuation of the switch means to disconnect electrical power from or prevent the application of electrical power to the disc drives.

4. Apparatus according to claim 3, wherein the interlock means physically maintains the switch means in a state where electrical power cannot be applied to the disc drives until the zero insertion force connector has been mated and electrical connections have been completed between the respective halves of the connector.

5. Apparatus according to claim 2, wherein the interlock means physically maintains the switch means in a state where electrical power cannot be applied to the disc drives until the zero insertion force connector has been mated and electrical connections have been completed between the respective halves of the connector.

* * * * *